United States Patent [19]
Song et al.

[11] Patent Number: 5,916,974
[45] Date of Patent: Jun. 29, 1999

[54] MORPHOLOGY CONTROL IN POLYPROPYLENE GRAFT COPOLYMERS

[75] Inventors: Cheng Q. Song, Wilmington, Del.; Daniele Bigiavi, Elkton, Md.

[73] Assignee: Montell North America Inc., Wilmington, Del.

[21] Appl. No.: 08/993,163

[22] Filed: Dec. 18, 1997

[51] Int. Cl.⁶ ........................ C08F 255/02; C08F 255/04; C08F 255/06
[52] U.S. Cl. .......................... 525/244; 525/245; 525/257; 525/259; 525/285; 525/301; 525/309
[58] Field of Search ................................ 525/64, 69, 244, 525/245, 257, 259, 285, 301, 309

[56] References Cited

U.S. PATENT DOCUMENTS

| | | | |
|---|---|---|---|
| 3,839,172 | 10/1974 | Chapiro et al. | 204/159.17 |
| 4,085,169 | 4/1978 | Saito et al. | 526/212 |
| 4,196,065 | 4/1980 | Gaussens et al. | 204/159.17 |
| 4,243,765 | 1/1981 | Keskkula et al. | 525/86 |
| 4,376,794 | 3/1983 | Machi et al. | 427/44 |
| 4,377,010 | 3/1983 | Fydelor et al. | 3/1 |
| 5,140,074 | 8/1992 | DeNicola, Jr. et al. | 525/263 |
| 5,283,287 | 2/1994 | Kim et al. | 525/86 |

FOREIGN PATENT DOCUMENTS

0506247 B1  5/1995  European Pat. Off. .

*Primary Examiner*—Jeffrey C. Mullis

[57] ABSTRACT

A graft copolymer comprising a backbone of a propylene polymer material having a vinyl monomer graft polymerized thereto is produced by (1) treating a propylene polymer material with a free radical polymerization initiator, (2) treating the propylene polymer material with at least one grafting monomer capable of being polymerized by free radicals, in the presence of a polymerization rate modifier, and (3) removing any unreacted grafting monomer from the graft copolymerized propylene polymer material, decomposing any unreacted initiator, and deactivating any residual free radicals in the material. Use of the polymerization rate modifier increases the polymerization induction time on the polymer surface, consequently facilitating monomer diffusion into the interior of the polymer particles so that surface polymerization of the monomer is inhibited.

6 Claims, 5 Drawing Sheets

MORPHOLOGY CONTROL IN POLYPROPYLENE GRAFT COPOLYMERS

FIELD OF THE INVENTION

This invention relates to a process for the graft copolymerization of propylene polymer materials.

BACKGROUND OF THE INVENTION

The morphology of particles of grafted polyolefins is dependent on the polymerization conditions and on the porosity of the material used as the backbone of the graft copolymer. When the porosity of the starting material is too low, a typical polypropylene graft copolymer with 85 parts of monomer added per hundred parts of polypropylene has a tendency to form a surface layer with a high polymerized monomer content ("shelling"). When the monomer add level is high, this shelling often produces a tacky surface on the particles, resulting in poor flowability of the polymer particles, which in turn may cause reactor fouling.

A variety of polymerization inhibitors have been used during graft polymerization reactions. For example, U.S. Pat. No. 3,839,172 discloses a process for the radiation grafting of acrylic monomers onto perhalogenated olefin polymer substrates in which a polymerization inhibitor such as ferrous ammonium sulfate or copper chloride is present in the grafting medium to prevent homopolymerization of the acrylic monomer. U.S. Pat. No. 4,196,095 discloses the use of a polymerization inhibitor such as a combination of copper and copper acetate in a process for the radiation grafting of a hydrophilic compound onto a hydrophobic substrate in the presence of a crosslinking agent and a polar solvent-soluble substance. U.S. Pat. No. 4,377,010 discloses the use of homopolymerization inhibitors such as ferrous sulfate or potassium ferricyanide during the radiation-initiated graft polymerization of acrylic monomers onto a base polymer to make a biocompatible surgical device. U.S. Pat. No. 5,283,287 discloses the use of polymerization inhibitors such as catechol, hydroquinones, organic sulfides, and dithiocarbamates to control the sequence of acrylonitrile units in a process for preparing thermoplastic resin compositions having excellent HCFC resistance.

However, there is still a need for polymerization rate modifiers that will inhibit surface polymerization during the graft polymerization of propylene polymer materials and therefore improve the processability of the resulting polymer particles.

SUMMARY OF THE INVENTION

The process of this invention for making a graft copolymer comprises, in a substantially nonoxidizing environment,
   (a) treating particles of a propylene polymer material with an organic compound that is a free radical polymerization initiator;
   (b) treating the propylene polymer material over a period of time that coincides with or follows (a), with or without overlap, with about 5 to about 240 parts of at least one grafting monomer capable of being polymerized by free radicals, per hundred parts of the propylene polymer material, in the presence of a polymerization rate modifier capable of functioning in a substantially nonoxidizing environment; and
   (c) removing any unreacted grafting monomer from the resulting grafted propylene polymer material, decomposing any unreacted initiator, and deactivating any residual free radicals in the material.

Use of the polymerization rate modifier increases the polymerization induction time on the surface and consequently facilitates diffusion of the monomer into the particles of the propylene polymer material used as the starting material. Surface polymerization is inhibited and therefore the resulting particles exhibit a lower polymerized monomer content on the surface of the particles than in the interior of the particles. The polymerization rate modifier has no significant impact on the number average and weight average molecular weight, molecular weight distribution, xylene solubles at room temperature, grafting efficiency, or the mechanical properties of the graft copolymer product.

DETAILED DESCRIPTION OF THE INVENTION

The propylene polymer material that is used as the backbone of the graft copolymer can be:
   (a) a crystalline homopolymer of propylene having an isotactic index greater than 80, preferably about 85 to about 99;
   (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 85;
   (c) a crystalline random terpolymer of propylene and two olefins selected from the group consisting of ethylene and $C_4$–$C_8$ α-olefins, provided that the maximum polyinerized $C_4$–$C_8$ α-olefin content is 20% by weight, preferably about 16%, and, when ethylene is one of the olefins, the maximum polyinerized ethylene content is 5% by weight, preferably about 4%, the terpolyiner having an isotactic index greater than 85;

(d) an olefin polymer composition comprising:
 (i) about 10 parts to about 60 parts by weight, preferably about 15 parts to about 55 parts, of a crystalline propylene homopolymer having an isotactic index greater than 80, preferably about 85 to about 98, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, preferably about 90% to about 99%, and an isotactic index greater than 85;
 (ii) about 3 parts to about 25 parts by weight, preferably about 5 parts to about 20 parts, of a copolymer of ethylene and propylene or a $C_4$–$C_8$ α-olefin that is insoluble in xylene at ambient temperature; and
 (iii) about 30 parts to about 70 parts by weight, preferably about 20 parts to about 65 parts, of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight, preferably about 10% to about 60%, most preferably about 12% to about 55%, of ethylene and being soluble in xylene at ambient temperature and having an intrinsic viscosity of about 1.5 to about 4.0 dl/g;

the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages and has a flexural modulus of less than 150 MPa; and (e) a thermoplastic olefin comprising:
 (i) about 10% to about 60%, preferably about 20% to about 50%, of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85;
 (ii) about 20% to about 60%, preferably about 30% to about 50%, of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
 (iii) about 3% to about 40%, preferably about 10% to about 20%, of a copolymer of ethylene and propylene or a $C_4$–$C_8$ α-olefin that is insoluble in xylene at ambient temperature, wherein the composition has a flexural modulus of greater than 150 but less than 1200 MPa, preferably about 200 to about 1100 MPa, most preferably about 200 to about 1000 MPa.

Room or ambient temperature is ~25° C.

The $C_{4-8}$ α-olefins useful in the preparation of (d) and (e) include, for example, butene-1; pentene-1; hexene-1; 4-methyl-1-pentene, and octene-1.

The diene, when present, is typically a butadiene; 1,4-hexadiene; 1,5-hexadiene, or ethylidenenorbornene.

Propylene homopolymer is the preferred propylene polymer material.

The preparation of propylene polymer material (d) is described in more detail in U.S. Pat. Nos. 5,212,246 and 5,409,992, the preparation of which is incorporated herein by reference. The preparation of propylene polymer material (e) is described in more detail in U.S. Pat. Nos. 5,302,454 and 5,409,992, the preparation of which is incorporated herein by reference.

The process of this invention is most effective when the particles of propylene polymer material have a particle size greater than 150 μm. When the particle size is less than 150 μm, diffusion of the polymerizable monomer into the particle is usually rapid enough without using a polymerization rate modifier (PRM).

The monomers that can be graft polymerized onto the propylene polymer material backbone can be any monomeric vinyl compound capable of being polymerized by free radicals wherein the vinyl radical, $H_2C=CR-$, in which R is H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitriles and carboxylic acids and their derivatives, including acrylonitrile, methacrylonitrile, acrylarnide, methacrylamide; acrylic acid and acrylate esters, such as the methyl, ethyl, hydroxyethyl, 2-ethylhexyl, and butyl acrylate esters; methacrylic acid, ethacrylic acid, and methacrylate esters, such as the methyl, ethyl, butyl, benzyl, phenylethyl, phenoxyethyl, epoxypropyl, and hydroxypropyl methacrylate esters; maleic anhydride, and N-phenyl maleimide. Free radical-polymerizable dienes, such as butadiene, isoprene and their derivatives, can also be used. Multiple monomers from the same or different classes can be employed. Styrene, methyl methacrylate, methyl acrylate, inethacrylic acid, maleic anhydride, and acrylonitrile are the preferred grafting monomers.

The monomers are added in an amount of from about 5 parts to about 240 parts per hundred parts of the propylene polymer material, preferably about 20 to about 100 pph.

The graft copolymer is made by forming active grafting sites on the propylene polymer material by treatment with a peroxide or other chemical compound that is a free radical polymerization initiator. The free radicals produced on the polymer as a result of the chemical treatment initiate the polymerization of the monomers at these sites.

During the graft polymerization, the monomers also polymerize to form a certain amount of free or ungrafted polymer or copolymer. The morphology of the graft copolymer is such that the propylene polymer material is the continuous or matrix phase, and the polymerized monomers, both grafted and ungrafted, are a dispersed phase.

The treatment of the polymer with the initiator and with the grafting monomer is carried out in a substantially nonoxidizing atmosphere, as are the subsequent steps of the process. The expression "substantially nonoxidizing", when used to describe the environment or atmosphere to which the propylene polymer material is exposed, means an environment in which the active oxygen concentration, i.e., the concentration of oxygen in a form that will react with the free radicals in the polymer material, is less than 15%. Concentrations of less than 5% are preferred, and more preferably less than 1% by volume. The most preferred concentration of active oxygen is 0.004% or lower by volume. Within these limits, the nonoxidizing atmosphere can be any gas, or mixture of gases, that is oxidatively inert toward the free radicals in the olefin polymer material, e.g., inert gases such as nitrogen, argon, helium, and carbon dioxide.

Preparation of graft copolymers by contacting a propylene polymer material with a free radical polymerization initiator such as an organic peroxide and a vinyl monomer is described in more detail in U.S. Pat. No. 5,140,074, the preparation of which is incorporated herein by reference.

In the process of this invention the treatment of the propylene polymer material with the vinyl monomer is carried out in the presence of a PRM. The monomer and PRM are fed continuously into the reactor during the course of the polymerization. The PRM can be any free radical polymerization inhibitor that can function in a substantially nonoxidizing environment. Suitable PRMs include, for example, elemental sulfur; picric acid; benzoquinone and its derivatives; hydroxylamine and its derivatives; p-nitroso-N, N-dimethylaniline; N, N-nitrosomethylaniline; dinitrobenzenes; 1,3,5-trinitrobenzene; ferric chloride, and 1,3,5-trinitrotoluene. Sulfur, benzoquinone compounds, and hydroxylamine compounds are preferred.

Suitable benzoquinone compounds include, for example, 1,4-benzoquinone; 2-chloro-1,4-benzoquinone; 2,5-dimethyl-1,4-benzoquinone; 2,6-dichlorobenzoquinone; 2,5-dichlorobenzoquinone; 2,3-dimethyl-1,4-benzoquinone, and di-, tri- and tetrachloro-1,4-benzoquinones.

Suitable hydroxylamine compounds include, for example, N,N-diethylhydroxylamine; N,N-dimethylhydroxylamine; N,N-dipropylhydroxylamine, and N-nitrosophenylhydroxylamine.

The amount of PRM used depends upon the type of compound that is selected, but is generally within the range of about 5 parts to about 5000 parts by mole per million parts of monomer. For example, sulfur is used in an amount of about 50 to about 2000 parts per million parts of the polymerizable monomer, preferably about 100 parts to about 1000 parts. A benzoquinone compound or a hydroxylamine compound is used in an amount of about 50 parts to about 3000 parts per million parts of the polymerizable monomer, preferably about 100 parts to about 1500 parts.

As shown in FIGS. 1–5, the polymer particles without a PRM form a surface layer rich in polymerized monomer, since the polymerization rate is faster than the diffusion rate of the monomer into the polymer particles. When a PRM is added to the monomer feed, the surface of the particles contains monomer whose polymerization is retarded by the presence of the PRM. The monomer, along with the PRM, diffuses into the polymer particles. As the monomer diffuses into the polymer particle, it has no contact with fresh monomer feed containing the PRM, and therefore begins to polymerize. A radial distribution of the PRM occurs due to the reaction between the PRM and the free radicals. The polymerization starts where the PRM concentration is not high enough to stop the polymerization. This produces a low polymerized monomer content in the surface layer. Polymer particles with a low surface content of polymerized monomer have a less tacky surface during polymerization and thus better processability. No significant changes in the number average and weight average molecular weight, molecular weight distribution, xylene solubles at room temperature, grafting efficiency, or % conversion of monomer to polymer were found when a PRM was present during the graft polymerization.

It was also found that the use of N,N-diethylhydroxylamine as the PRM provided the additional benefit of suppressing gas phase polymerization and therefore reducing reactor fouling. The higher the reaction temperature, the greater the reduction in reactor fouling, since the effective concentration of the PRM in the vapor phase increases with the reaction temperature. N,N-diethylhydroxylamine is effective in reducing reactor fouling because of its low boiling point (125°–130° C.) compared to other PRMs and therefore a higher concentration in the gas phase under the reaction conditions.

Although the use of a PRM in a graft polymerization reaction has been described in terms of grafting polymerizable monomers onto solid particles of the backbone polymer, a PRM can also be used during a suspension or emulsion graft polymerization process or in reactive extrusion, processes which are well known to those skilled in the art.

The porosity of the propylene homopolymer used as the backbone polymer in the manufacture of the graft copolymers in the examples is measured as described in Winslow, N. M. and Shapiro, J. J., "An Instrument for the Measurement of Pore-Size Distribution by Mercury Penetration," ASTM Bull., TP 49, 39–44 (February 1959), and Rootare, H. M., "A Review of Mercury Porosimetry," 225–252 (In Hirshhom, J. S. and Roll, K. H., Eds., *Advanced Experimental Techniques in Powder Metallurgy*, Plenum Press, New York, 1970).

The % xylene solubles at 25° C. was determined by dissolving 2 g of polymer in 200 ml of xylene at 135° C., cooling in a constant temperature bath to 25° C. and filtering through fast filter paper. An aliquot of the filtrate was evaporated to dryness, the residue weighed, and the weight % soluble fraction calculated.

The test methods used to evaluate the molded specimens were:

| | |
|---|---|
| Izod impact | ASTM D-256A |
| Tensile strength | ASTM D-638-89 |
| Flexural modulus | ASTM D-790-86 |
| Flexural strength | ASTM D-790-86 |
| Elongation at break | ASTM D-638-89 |
| Melt flow rate, 230° C., 3.8 kg | ASTM 1238 |
| Weldline strength | ASTM D-638-89 |

In this specification, all parts and percentages are by weight unless otherwise noted.

EXAMPLE 1

This example demonstrates the effect of using sulfur as a PRM during a graft polymerization reaction using a propylene homopolymer (PP) as the polymer backbone, to which was grafted polystyrene (PS).

The propylene homopolymer used as the backbone polymer was spherical in form, had a MFR of 15.5 g/10 min and a porosity of 0.17 cm³/g, and is commercially available from Montell USA Inc.

The monomers were grafted onto the polypropylene backbone at a grafting temperature of 120° C. using the previously described peroxide-initiated graft polymerization process. Eighty-five parts by weight of styrene were added per 100 parts of polypropylene. Lupersol PMS 50% t-butyl peroxy-2-ethyl hexanoate in mineral spirits, commercially available from Elf Atochem, was used as the peroxide initiator. The monomer was fed at 1 pph/min. A monomer to initiator molar ratio of 105 was used. The reaction conditions were maintained at 120° C. for 30 minutes after monomer addition was completed and the temperature was then raised to 140° C. for 60 minutes under a nitrogen purge. The polymerization reactor was a two gallon autoclave equipped with a helical blade agitator and a monomer feed pump, as well as a temperature control system.

The graft copolymer is characterized in Table 1. In Table 1, the sulfur content is given as parts per million parts by weight of styrene, the feed rate is given as parts of styrene monomer per hundred parts of propylene homopolymer/min. Total polystyrene was determined with a BioRad FSS-7 Fourier transform infrared (FTIR) analyser and is expressed as parts of polystyrene per hundred parts of polypropylene. The molecular weight measurements were made by gel permeation chromatography.

TABLE 1

| Sample | Control | 1 | 2 |
|---|---|---|---|
| Sulfur (ppm) | 0 | 200 | 400 |
| Feed rate (pph/min) | 1 | 1 | 1 |
| Total PS (pph) | 77.8 | 91.6 | 88.9 |
| Mn (x $10^{-3}$) | 74 | 68 | 72 |
| Mw (x $10^{-3}$) | 291 | 267 | 315 |
| Mw/Mn | 3.9 | 3.9 | 4.4 |
| Free PS (wt. %) | 32.5 | 35.0 | 33.1 |
| Graft efficiency (wt. %) | 25.7 | 26.8 | 29.7 |
| Agitator speed (rpm) | Fell to 0 when 85 pph monomer were added | 120 throughout | 120 throughout |

For the control sample, in which no sulfur was present during graft copolyinerization, there was difficulty with agitation after the addition of about 70 parts of styrene per hundred parts of polypropylene. After all of the monomer was added the agitator stopped completely, which resulted in agglomerates and chunks.

The data show that there is no significant difference in molecular weight, molecular weight distribution, or grafting efficiency between the polymer made with sulfur as the PRM and without sulfur.

Figure 1:
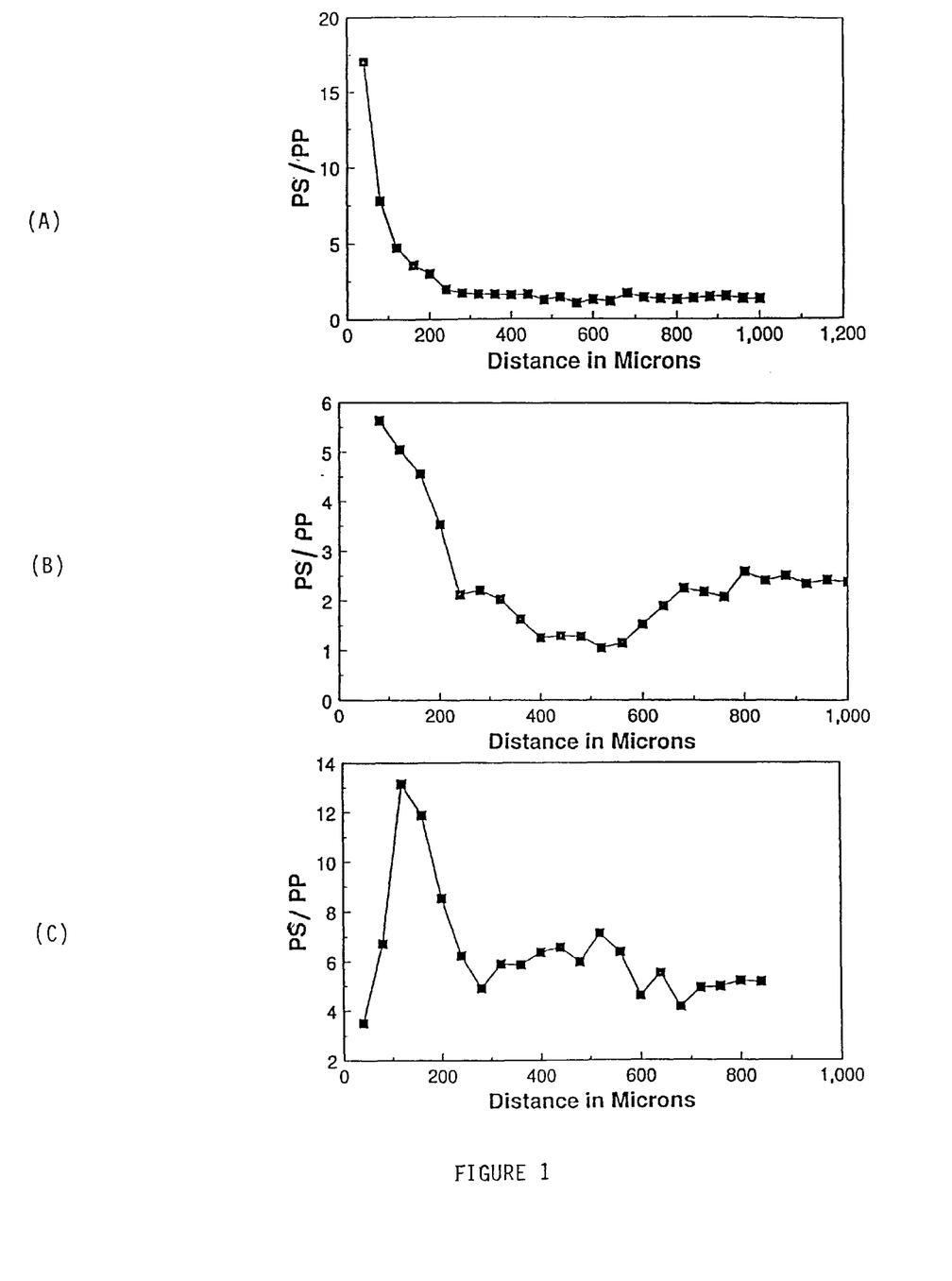
FIG. 1 is a Fourier transform infrared (FTIR) scan along the radius of a microtomed particle of a graft copolymer comprising a backbone of polypropylene, to which was grafted polystyrene. In (A), no sulfur was added to the monomer feed as a polymerization rate modifier (PRM). In (B), 200 parts of sulfur per million parts by weight of styrene were added. In (C), 400 ppm sulfur were added.

FIG. 1 is a plot of the PS/PP ratio along the radius of the polymer particles against the distance from the surface of the polymer particles in microns (A) when no sulfur was added, (B) when 200 parts of sulfur per million parts by weight of styrene were added, and (C) when 400 ppm sulfur were added. The plots were made by Fourier transform infrared (FTIR) mapping. A very pronounced polystyrene surface layer was found in the polymer without sulfur. When 200 ppm sulfur were added during graft polymerization, the surface polystyrene concentration was greatly decreased, and the polystyrene concentration increased in the interior of the particles. The surface polystyrene concentration decreased even further with the addition of 400 ppm sulfur. At this level of addition, the surface layer had less polystyrene than the inside of the polymer particles.

EXAMPLE 2

This example demonstrates the effect of using sulfur as a PRM during a graft polymerization reaction using a propylene homopolymer as the polymer backbone, to which was grafted polystyrene.

The propylene homopolymer used as the backbone polymer was spherical in form, had a MFR of 20 g/10 min and a porosity of 0.36 cm³/g, and is commercially available from Montell USA Inc. The graft copolymer was prepared as described in Example 1. The graft copolymer is characterized in Table 2.

TABLE 2

| Sample | Control | 1 | 2 |
|---|---|---|---|
| Sulfur (ppm) | 0 | 400 | 1200 |
| Feed rate (pph/min) | 1 | 1 | 1 |
| Total PS (pph) | 85.1 | 85.0 | 80.3 |
| Mn (x $10^{-3}$) | 71 | 71 | 52 |
| Mw (x $10^{-3}$) | 263 | 288 | 245 |
| Mw/Mn | 3.7 | 4.1 | 4.7 |
| Free PS (wt. %) | 32.5 | 34.7 | 33.0 |
| Graft efficiency (wt. %) | 29.4 | 24.5 | 25.9 |
| Agitator speed (rpm) | Fell to 0 when 85 pph monomer were added | 120 throughout | 120 throughout |

The data show that there is no significant difference in molecular weight, molecular weight distribution, or grafting efficiency between the polymer made with sulfur as the PRM and without sulfur.

Figure 2:
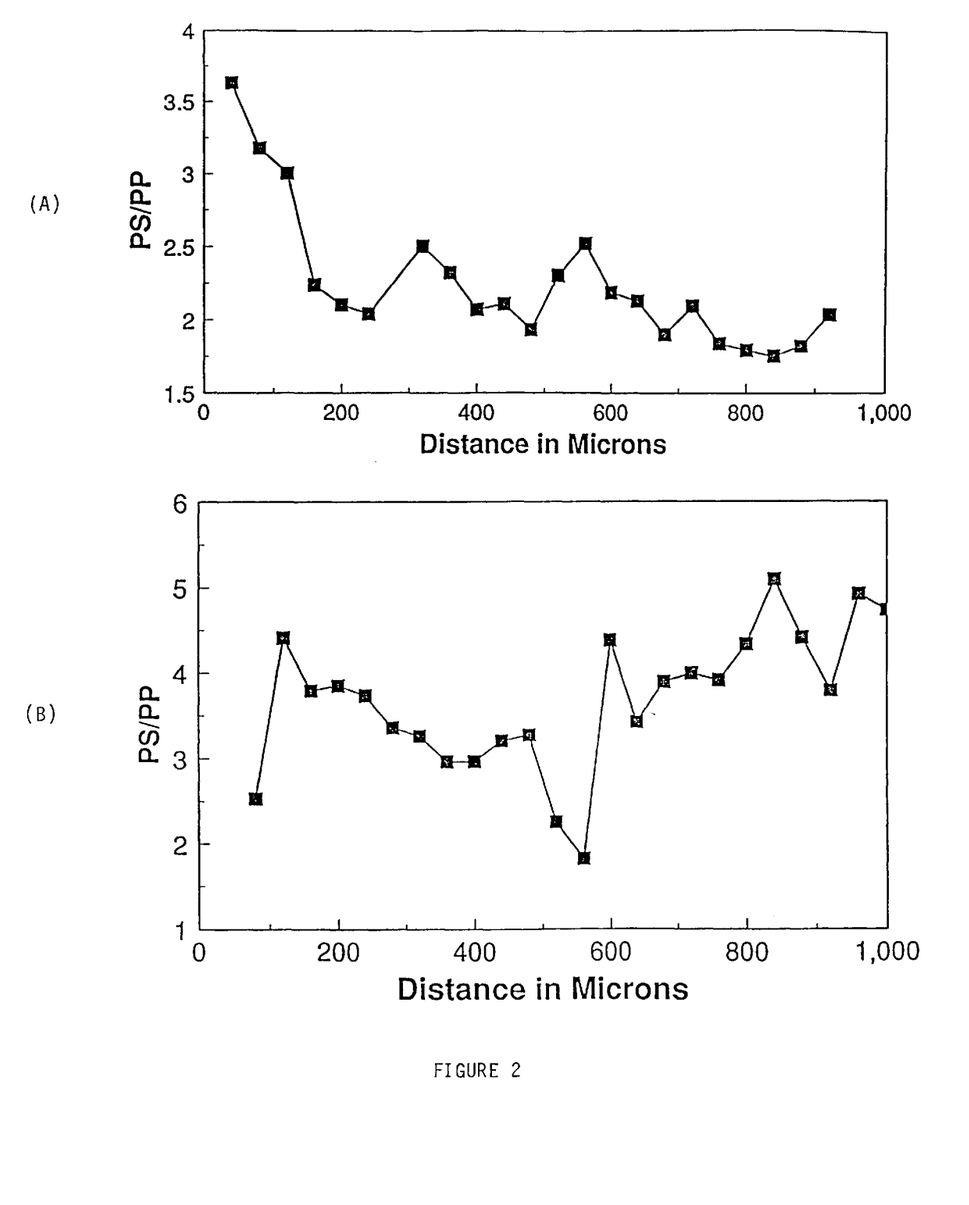
FIG. 2 is a FTIR scan along the radius of a microtomed particle of a graft copolymer comprising a backbone of polypropylene, to which was grafted polystyrene. In (A), no sulfur was added to the monomer feed as a PRM. In (B), 400 ppm of sulfur were added.

FIG. 2 is a plot of the PS/PP ratio along the radius of the polymer particles against the distance from the surface of the polymer particles in microns (A) when no sulfur was added, and (B) when 400 parts of sulfur per million parts by weight of styrene were added. The plots were made by FTIR mapping. A pronounced polystyrene surface layer was found in the polymer without sulfur. The surface polystyrene concentration decreased with the addition of 400 ppm sulfur. At this level of addition, the surface layer had less polystyrene than the portion of the polymer particles below the surface.

EXAMPLE 3

This example illustrates the effect of the morphology of the polymer particles, the the monomer content, and the test conditions on the flowability of graft copolymer particles in the presence of various amounts of sulfur as the PRM. The graft copolymer was made from a propylene homopolymer backbone, to which was grafted polystyrene.

The propylene homopolymer used as the backbone polymer was the same as in Example 1. The graft copolymer was prepared as described in Example 1. The polymer particles were subjected to a flowability test as described below. The amount of sulfur present, the temperature of the test, and the maximum styrene concentration for adequate flowability are shown in Table 3.

The flowability test was conducted at two temperatures, i.e., room temperature (22°–25° C.) and 100° C. The samples were placed in a round bottom glass flask that was immersed in an oil bath to control the temperature of the sample. Styrene with 5000 ppm t-butyl catechol inhibitor to prevent thermal polymerization during testing was added to the polymer at the required dosage and agitated in the flask for 30 minutes before conducting the flowability test. The amounts of monomer added to the samples were 0, 1, 2, 3, 5, 10, and 30 wt. %. ASTM D-1895-89, "Apparent Density, Bulk Factor and Pourability of Plastic Materials" was used to evaluate the flowability of samples prepared under various conditions. The results are given in Table 3.

TABLE 3

| Sulfur (ppm) | Temperature (° C.) | Maximum Styrene Concentration (wt. %) | Comments |
|---|---|---|---|
| 0 | Room | <1 | Tapped funnel at 0% styrene |
| 0 | 100 | <1 | |
| 200 | Room | <3 | |
| 200 | 100 | <3 | Tapped funnel at 2% styrene |
| 400 | Room | No limit | Up to 30% styrene |
| 400 | 100 | <30 | |

The flowability of the samples corresponded quite well to their morphology. The samples prepared without sulfur had a thick layer of polystyrene at the surface of the particles. Flow through the funnel stopped at a styrene monomer concentration of <1% due to surface stickiness. Samples prepared with 200 ppm sulfur had good flowability until the styrene monomer concentration reached 3 wt. %. The best flowability was obtained from the samples with 400 ppm sulfur addition during polymerization. These samples flowed through the funnel even at a styrene monomer concentration of 10 wt. % at 100° C. and of 30 wt. % at room temperature.

EXAMPLE 4

This example describes the effect of sulfur addition on the mechanical properties of impact-modified formulations containing graft copolymers comprising a propylene homopolymer backbone, to which was grafted polystyrene.

The graft copolymers were made from a propylene homopolymer backbone, to which was grafted 85 parts of polystyrene per hundred parts of polypropylene as described in Example 1. The propylene homopolymer used as the polymer backbone for graft copolymer 1 had a MFR of 9 g/10 min, a porosity of 0.51 cm$^3$/g and a bulk density of 0.36 g/cm$^3$, and is commercially available from Montell USA Inc. The propylene homopolymer copolymer 2 had a porosity of 0.17 cm$^3$/g. The propylene homopolymer used as the backbone polymer for graft copolymer 3 had a porosity of 0.36 cm$^3$/g.

The graft copolymers were blended with 34.9% by weight of a broad molecular weight distribution polypropylene (BMWD PP) having a polydispersity index of 7.4, a MFR of 1 g/10 min, and xylene solubles at room temperature of 1.5%, commercially available from Montell USA Inc.

The samples were compounded on a 34 mm co-rotating, intermeshing Leistritz LSM twin screw extruder. Each sample was extruded as pellets at a barrel temperature of 230° C., a screw speed of 375 rpm, and a throughput rate of 36 lb/hr for the Control Sample and Sample 1, and 43 lb/hr for Sample 2.

The stabilizer package used was 0.1% of calcium stearate and 0.2% of Irganox B-225 antioxidant, a blend of 1 part Irganox 1010 tetrakis[methylene(3,5-di-tert-butyl-4-hydroxyhydrocinnamate)]methane stabilizer and 1 part Irgafos 168 tris(2,4-di-tert-butylphenyl) phosphite stabilizer, commercially available from CIBA Specialty Chemicals Corporation.

In Table 4 the impact modifiers were Kraton RP6912 styrene/ethylene-isoprene/styrene tri-block copolymer, commercially available from Shell Chemical Company, and EPM 306P random ethylene/propylene copolymer having an ethylene content of 57%, commercially available from the Polysar Rubber Division of Miles, Incorporated.

TABLE 4

| Sample | Control | 1 | 2 |
|---|---|---|---|
| Sulfur content (ppm) | 0 | 200 | 400 |
| Graft copolymer 1 (wt. %) | 34.9 | | |
| Graft copolymer 2 (wt. %) | | 34.9 | |
| Graft copolymer 3 (wt. %) | | | 34.9 |
| BMWD PP (wt. %) | 34.9 | 34.9 | 34.9 |
| Kraton RP 6912 (wt. %) | 15.0 | 15.0 | 15.0 |
| EPM 306P (wt. %) | 15.0 | 15.0 | 15.0 |
| Irganox B225 (wt. %) | 0.2 | 0.2 | 0.2 |
| Calcium stearate (wt. %) | 0.1 | 0.1 | 0.1 |

The compounded samples were dried at 80° C. for at least 4 hours prior to molding to remove moisture. One inch ×⅛" test bars were used for all of the physical property measurements. Test bars were produced on a 5 oz Battenfeld injection molding machine at a barrel temperature of 450° F. and a mold temperature of 130° F.

The results of the property evaluations for each formulation are given in Table 5. In the table, NB=no break.

TABLE 5

| Sample | Control | 1 | 2 |
|---|---|---|---|
| Sulfur content (ppm) | 0 | 200 | 400 |
| MFR (dg/min), (230° C., 3.8 kg) | 6.4 | 4.0 | 4.5 |
| Flexural modulus (kpsi) (1% secant, 0.05"/min | 108 | 120 | 121 |
| Flexural strength (psi) | 2903 | 3231 | 3273 |
| Izod impact strength (ft.lb/in) (@ 23° C.) | NB (14.6) | NB (14.6) | NB (14.3) |
| Izod impact strength (ft.lb/in) (@ −30° C.) | 4.2 | 8.9 | 4.1 |
| Tensile strength (psi) (2"/min) | 3258 | 3475 | 3269 |
| Elongation at break (%) | >892 | 820 | 709 |

The data show that the physical properties of the samples with sulfur addition during polymerization are similar to those of the control made without sulfur addition.

EXAMPLE 5

This example demonstrates the effect of using 1,4-benzoquinone as a PRM during a graft polymerization reaction using a propylene homopolymer as the polymer backbone, to which was grafted polystyrene.

The propylene homopolymer used as the backbone polymer had a porosity of 0.17 cm$^3$/g. The graft copolymer was prepared as described in Example 1.

Without benzoquinone, the conversion of monomer to polymer was 91.7%. With the addition of 50 parts by weight of benzoquinone per million parts of styrene, the conversion was 87.1%. With the addition of 800 ppm benzoquinone, the conversion was 96.2%.

Without the addition of a benzoquinone PRM, the agitator speed fell to 0 when 85 parts of styrene per hundred parts of polypropylene were added. With the addition of 50 ppm of benzoquinone, the agitation decreased to 80 rpm. With the addition of 800 ppm of benzoquinone, the agitator speed remained at 120 rpm throughout the reaction.

Figure 3:
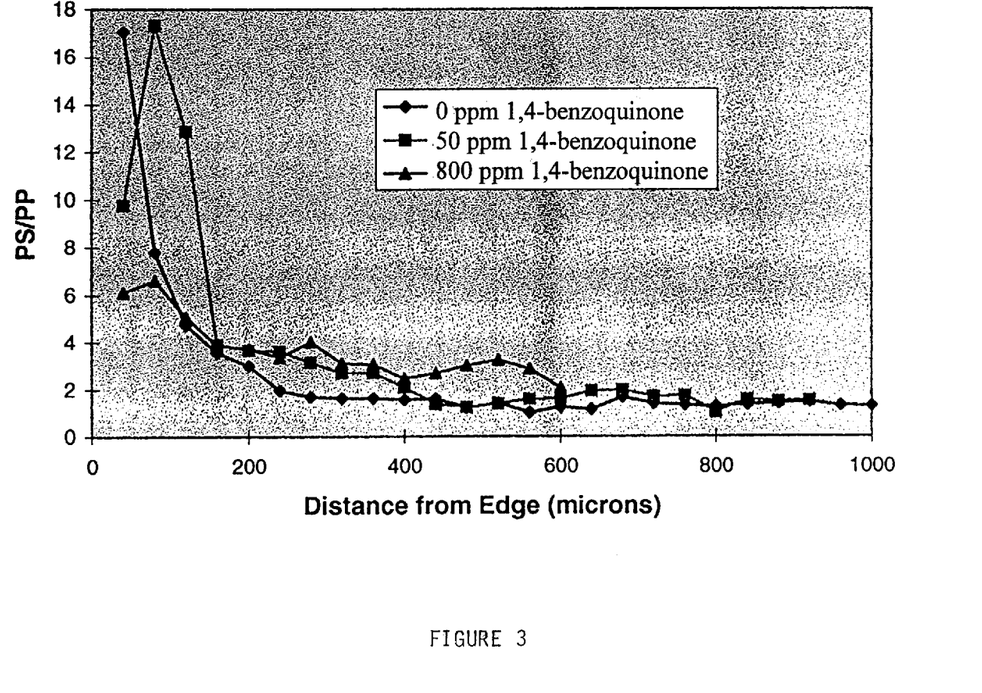
FIG. 3 is a FTIR scan along the radius of a microtomed particle of a graft copolymer comprising a backbone of polypropylene, to which was grafted polystyrene. Three plots are shown: without the addition of a PRM, with the addition of 50 parts of 1,4-benzoquinone per million parts of styrene, and with the addition of 800 ppm 1,4-benzoquinone.

FIG. 3 is a plot of the PS/PP ratio along the radius of the polymer particles against the distance from the surface of the polymer particles in microns when no benzoquinone was added, when 50 parts of benzoquinone per million parts by weight of styrene were added and when 800 ppm benzoquinone were added. The plots were made by FTIR mapping. A very pronounced polystyrene surface layer was found on the polymer particles without benzoquinone. When 50 ppm benzoquinone were added during graft polymerization, the surface polystyrene concentration was greatly decreased, and the polystyrene concentration increased in the interior of the particles. The surface polystyrene concentration decreased even further with the addition of 800 ppm benzoquinone. At this level of addition, the surface layer had less polystyrene than the inside of the polymer particles.

EXAMPLE 6

This example shows the effect on polymer properties when 1,4-benzoquinone is used as the PRM during a graft polymerization reaction using two different propylene homopolymers as the backbone polymer, to which was grafted polystyrene.

The graft copolymers were prepared as described in Example 1. The propylene homopolymer used as the backbone polymer for graft copolymer 4 had a porosity of 0.11 cm$^3$/g and a bulk density of 0.48 g/cm$^3$, and is commercially available from Montell USA Inc. The propylene homopolymer used as the backbone polymer for graft copolymer 1 had a porosity of 0.51 cm$^3$/g. The graft copolyiners are characterized in Table 6.

TABLE 6

| Graft Co-polymer | Inhibitor (ppm, wt.) | Mw (× 10$^{-3}$) | Mn (× 10$^{-3}$) | PS (pph) by FTIR | XSRT (wt. %) | Gr. Eff. (wt. %) |
|---|---|---|---|---|---|---|
| 4 | 1350 | 219 | 51 | 73.4 | 29.0 | 31.6 |
| 4 | 0 | 246 | 67 | 81.5 | 36.3 | 19.3 |
| 1 | 0 | 216 | 61 | 81.9 | 33.2 | 26.4 |
| 1 | 1350 | 245 | 59 | 76.9 | 33.5 | 23.0 |

The data show that there is no significant difference in molecular weight, xylene solubles at room temperature (XSRT), and grafting efficiency between the polymer made with benzoquinone and without benzoquinone, except for a slightly lower grafting efficiency for graft copolymer 4 without a PRM due to "shelling" during polymerization, i.e., a high polymerized monomer content in the surface layer.

EXAMPLE 7

This example describes the effect of the addition of 1,4-benzoquinone on the mechanical properties of impact-modified formulations containing graft copolymers comprising a propylene homopolymer backbone, to which was grafted polystyrene.

The graft copolymers were made from a propylene homopolymer backbone, to which was grafted 85 parts of polystyrene per hundred parts of the polypropylene as described in Example 1. The propylene homopolymer used as the polymer backbone for graft copolymer 1 had a porosity of 0.51 cm$^3$/g. The propylene homopolymer used as the backbone polymer for graft copolymer 2 had a porosity of 0.17 cm$^3$/g. The propylene homopolymer used as the backbone polymer for graft copolymer 3 had a porosity of 0.36 cm$^3$/g. The propylene homopolymer used as the backbone polymer for graft copolymer 4 had a porosity of 0.11 cm$^3$/g.

The graft copolymers were blended with 34.9% of the broad molecular weight distribution polypropylene described in Example 4. The samples were compounded as described in Example 4, except that the throughput rate for the Control Sample and Samples 2 and 3 was 36 lb/hr, and for Sample 1 it was 40 lb/hr.

The stabilizer package used was 0.1% by weight of calciun stearate and 0.2% by weight of Irganox B-225 antioxidant, commercially available from CIBA Specialty Chemicals Corporation. The impact modifiers in Table 7 are described in Example 4.

TABLE 7

| Sample | Control | 1 | 2 | 3 |
|---|---|---|---|---|
| 1,4-Benzoquinone (ppm, wt.) | 0 | 1350 | 1350 | 1350 |
| Graft copolymer 1 (wt. %) | 34.9 | | | |
| Graft copolymer 2 (wt. %) | | 34.9 | | |
| Graft copolymer 3 (wt. %) | | | 34.9 | |
| Graft copolymer 4 (wt. %) | | | | 34.9 |
| BMWD PP (wt. %) | 34.9 | 34.9 | 34.9 | 34.9 |
| Kraton RP6912 (wt. %) | 15.0 | 15.0 | 15.0 | 15.0 |
| EPM 306P (wt. %) | 15.0 | 15.0 | 15.0 | 15.0 |
| Irganox B225 (wt. %) | 0.2 | 0.2 | 0.2 | 0.2 |
| Calcium stearate (wt. %) | 0.1 | 0.1 | 0.1 | 0.1 |

The samples were compounded and test bars were produced as described in Example 4. The results of the property evaluations for each formulation are given in Table 8. In the table, NB=no break.

TABLE 8

| Sample | Control | 1 | 2 | 3 |
|---|---|---|---|---|
| 1,4-Benzoquinone (ppm wt.) | 0 | 1350 | 1350 | 1350 |
| MFR (dg/min), (230° C., 3.8 kg) | 6.4 | 6.6 | 6.5 | 5.8 |
| Flexural modulus (kpsi) (1% secant, 0.05"/min) | 108 | 110 | 109 | 109 |
| Flexural strength (psi) | 2903 | 2991 | 2982 | 2963 |
| Izod impact strength (ft.lb/in) (@ 23° C.) | NB (14.6) | NB (15.1) | NB (15.0) | NB (15.0) |
| Izod impact strength (ft.lb/in) (@ −30° C.) | 4.2 | 5.7 | 5.7 | 8.2 |
| Tensile strength (psi) (2"/min) | 3258 | 3174 | 3299 | 3367 |
| Elongation at break (%) | >892 | 808 | 873 | 892 |

The data show that the physical properties of the samples with benzoquinone addition during polymerization have similar physical properties compared to the control made without benzoquinone addition.

EXAMPLE 8

This example illustrates the effect on polymer characteristics and on the physical properties of the polymer when 1,4-benzoquinone is used as a PRM during a graft polymerization reaction using two different propylene homopolymers as the polymer backbone, to which was grafted poly (methyl methacrylate-co-methyl acrylate) (PMMA).

The graft copolymer was prepared as described in Example 1, except that 95 parts of monomer were added per hundred parts of polypropylene, the reaction temperature was 115° C., the monomer to initiator ratio was 120, and the molar ratio of methyl methacrylate to methyl acrylate was 95 to 5. The propylene homopolymer used as the backbone polymer for graft copolymer 1 had a porosity of 0.51 cm$^3$/g. The propylene homopolymer used as the backbone polymer for graft copolymer 4 had a porosity of 0.11 cm$^3$/g. The graft copolymers are characterized in Table 9.

TABLE 9

| Graft Co-polymer | Inhibitor (ppm, wt.) | Mw (× 10$^{-3}$) | Mn (× 10$^{-3}$) | PMMA (pph) by FTIR | XSRT (wt. %) | Gr. Eff. (wt. %) |
|---|---|---|---|---|---|---|
| 4 | 0 | 280 | 73 | 50.8 | 42.3 | — |
| 4 | 1350 | 149 | 60 | 88.0 | 38.6 | 17.6 |
| 1 | 0 | 109 | 49 | 88.0 | 41.7 | 11.0 |
| 1 | 800 | 120 | 56 | 83.4 | 37.2 | 18.3 |
| 1 | 1350 | 132 | 60 | 81.4 | 38.1 | 15.1 |

The data show that there is no significant difference in molecular weight, xylene solubles at room temperature, and grafting efficiency between the polymer made with benzoquinone as the PRM and without benzoquinone, except for graft copolymer 4 without the PRM. The molecular weight is abnormally high due to severe "shelling" that occurred during polymerization.

The samples were compounded on a 34 mm co-rotating, intermeshing Leistritz LSM twin screw extruder at a barrel temperature of 210° C., a screw speed of 250 rpm, and a throughput rate of 20 lb/hr. Test bars for physical property measurements were prepared as described in Example 4. The results of the property evaluations for each sample are given in Table 10.

TABLE 10

| Sample | Control 1 | Control 2 | 1 | 2 | Control 3 | 3 |
|---|---|---|---|---|---|---|
| Graft copolymer | 1 | 1 | 1 | 1 | 4 | 4 |
| 1,4-Benzoquinone (ppm, wt.) | 0 | 0 | 800 | 1350 | 0 | 1350 |
| Notched Izod at 23° C. (ft.lb/in) | 0.85 | 0.95 | 0.84 | 0.89 | 0.34 | 1.00 |
| Notched Izod at 0° C. (ft.lb/in) | 0.18 | 0.17 | 0.17 | 0.19 | — | 0.18 |
| Tensile strength (psi) | 5834 | 5820 | 5681 | 5768 | 5052 | 5671 |
| Weldline strength (psi) | 5098 | 4347 | 5223 | 5378 | 4762 | 4462 |
| Elongation at break (%) | 20 | 20 | 16 | 19 | 12 | 19 |
| Flexural modulus (0.5"/min) (kpsi) | 338 | 339 | 328 | 327 | 309 | 317 |
| Flexural strength (0.5"/min) (psi) | 10150 | 10220 | 9980 | 10000 | 9020 | 9860 |
| MFR (dg/min) (3.8 kg, 230° C.) | 9.3 | 11.0 | 12.0 | 11.0 | — | 9.5 |

The data show that the physical properties of the samples with benzoquinone added during polymerization have similar physical properties compared to the control made without benzoquinone addition, except for Control 3 for the reasons given in the previous example.

Figure 4:
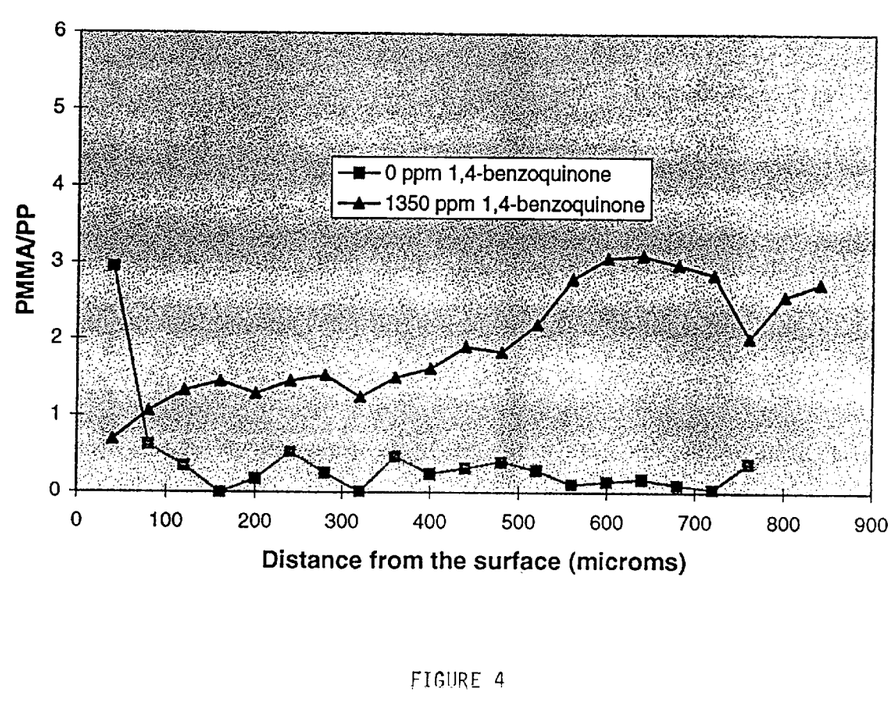
FIG. 4 is a FTIR scan along the radius of a microtomed particle of a graft copolymer comprising a backbone of polypropylene, to which was grafted poly(methyl methacrylate-co-methyl acrylate). Two plots are shown: without the addition of a PRM and with the addition of 1350 parts of 1,4-benzoquinone per million parts by weight of monomer.

FIG. 4 is a plot of the PMMA/PP ratio along the radius of the polymer particles (graft copolymer 4) against the distance from the surface of the polymer particles in microns when no benzoquinone was added, and when 1350 parts of benzoquinone were added per million parts by weight of monomer. The plots were made by FTIR mapping. A very pronounced PMMA surface layer was found in the polymer particles without benzoquinone. When 1350 ppm benzoquinone were added during graft polymerization, the surface PMMA concentration was greatly decreased.

EXAMPLE 9

This example demonstrates the effect of using picric acid as a 90% slurry in water as a PRM during a graft polymerization reaction using a propylene homopolymer as the polymer backbone, to which was grafted polystyrene.

The propylene homopolymer used as the backbone polymer had a porosity of 0.17 cm$^3$/g. The graft copolymer was prepared as described in Example 1.

Without picric acid, the conversion of monomer to polymer was 91.7%. With the addition of 400 parts by weight of picric acid per million parts of styrene, the conversion was 95.8%. Without the addition of a PRM, the agitator speed fell to 0 when 85 parts of monomer per hundred parts of polypropylene were added. With the addition of 400 ppm of picric acid, the agitator speed remained at 120 rpm throughout the reaction.

EXAMPLE 10

This example demonstrates the effect of using N,N-diethylhydroxylamine (DEHA) as a PRM during a graft polymerization reaction using a propylene homopolymer as the polymer backbone, to which was grafted polystyrene.

The propylene homopolymer used as the backbone polymer had a porosity of 0.17 cm$^3$/g. The graft copolymer was prepared as described in Example 1. The graft copolymer is characterized in Table 11.

TABLE 11

| DEHA (ppm, mole) | Mw (× 10$^{-3}$) | Mn (× 10$^{-3}$) | PS (pph) by FTIR | XSRT (wt. %) | Gr. Eff. (wt. %) |
|---|---|---|---|---|---|
| 0 | 291 | 74 | 77.8 | 32.5 | 25.7 |
| 830 | 213 | 60 | 78.0 | 34.2 | 22.0 |
| 1660 | 204 | 60 | 80.3 | 34.8 | 21.9 |

The data show that there is no significant difference in molecular weight, total polystyrene, xylene solubles at room temperature, or grafting efficiency between the polymer with DEHA as the PRM and without DEHA.

Without DEHA, the % conversion of monomer to polymer was 91.7. With the addition of 830 parts of DEHA per million parts of styrene (by mole), the conversion was 97.7%, and with 1660 ppm DEHA (by mole) the conversion was 98.2%.

Without the addition of a PRM, the agitator speed fell to 0 when 85 parts of styrene were added per hundred parts of polypropylene. With the addition of 830 and 1660 ppm DEHA, the agitator speed remained at 120 rpm throughout the reaction.

EXAMPLE 11

This example describes the effect of the addition of DEHA as a PRM on the polymer properties during a graft polymerization reaction using a propylene homopolymer as the polymer backbone, to which was grafted poly(methyl methacrylate-co-methyl acrylate).

The propylene homopolymer used as the backbone polymer had a porosity of 0.11 cm$^3$/g. The graft copolymer was prepared as described in Example 1, except that 95 parts of monomer were added per hundred parts of polypropylene, the monomer to initiator molar ratio was 120, the reaction temperature was 115° C., and the ratio of methyl methacrylate to methyl acrylate was 95 to 5. The graft copolymer is characterized in Table 12.

TABLE 12

| DEHA (ppm, mole) | Mw (× 10⁻³) | Mn (× 10⁻³) | XSRT (wt. %) | Gr. Eff. (wt. %) |
|---|---|---|---|---|
| 1000 | 127 | 49 | 36.3 | 16.3 |
| 1500 | 135 | 45 | 37.0 | 10.0 |
| 1750 | 143 | 48 | 36.6 | 15.4 |

The data show that there is no significant difference in molecular weight, xylene solubles at room temperature, and grafting efficiency between the polymer made with various amounts of DEHA as the PRM.

With the addition of 1000 parts of DEHA per million parts of methyl methacrylate (by mole), the conversion of monomer to polymer was 91.2 weight %. With the addition of 1500 ppm DEHA (by mole), the conversion was 92.5%. With the addition of 1750 ppm DEHA (by mole), the conversion was 88.0%.

When a PRM was present, the agitator speed remained at 120 rpm throughout the reaction.

EXAMPLE 12

This example illustrates the effect of the morphology of the polymer particles on the % conversion of monomer to polymer and the flowability of the polymer particles. The graft copolymer was made from two different propylene homopolymers as the polymer backbone, to which was grafted polystyrene. The PRM was DEHA.

The graft copolymers were prepared as described in Example 1, except that the polymerization reactor is a 130 liter Littleford reactor which has a horizontal mechanical agitator and is commercially available from Littleford Day, Inc. The propylene homopolymer used as the polymer backbone for graft copolymer 1 had a porosity of 0.51 cm³/g. The propylene homopolymer used as the backbone polymer for graft copolymer 4 had a porosity of 0.11 cm³/g.

The flowability of the polymer particles was indicated by the maximum current requirement for the agitator in amps. The higher the amperage, the poorer the flowability. The results are given in Table 13.

TABLE 13

| Graft Copolymer | DEHA (ppm, mole) | Conversion (wt. %) | Max. Current Requirement for Agitator (amps) |
|---|---|---|---|
| 1 | 0 | 99.6 | 6.5 |
| 1 | 1000 | 97.3 | 6.4 |
| 4 | 0 | 95.6 | 11.7 |
| 4 | 750 | 97.5 | 8.2 |
| 4 | 1000 | 95.3 | 7.5 |
| 4 | 1250 | 98.2 | 7.2 |

The data show that the flowability improved when DEHA was present during the polymerization.

Figure 5:
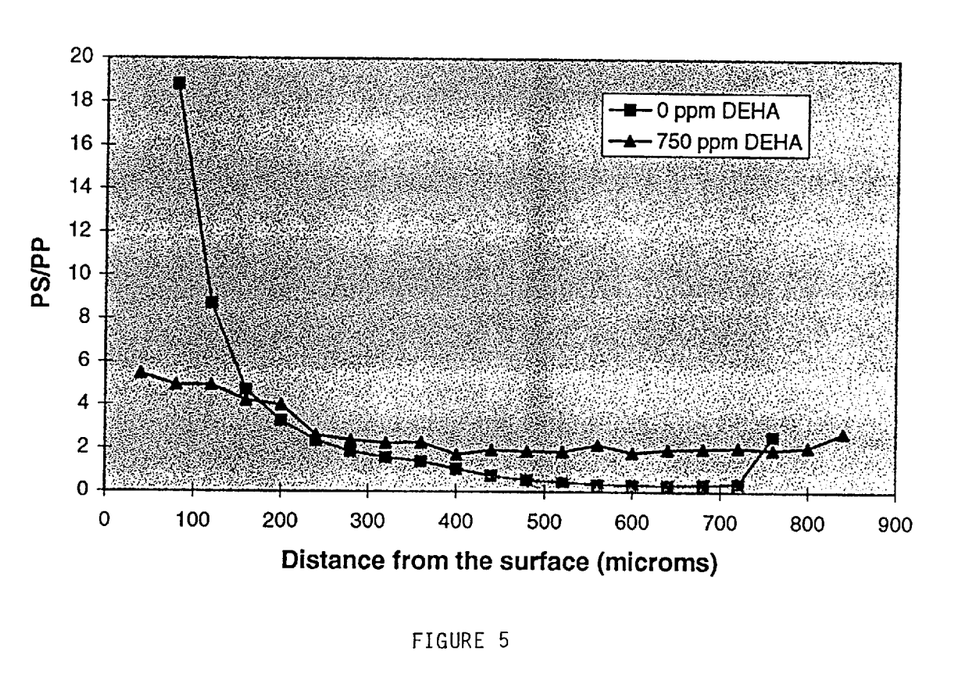
FIG. 5 is a FTIR scan along the radius of a microtomed particle of a graft copolymer comprising a backbone of polypropylene, to which was grafted polystyrene. Two plots are shown: without the addition of a PRM and with the addition of 750 parts of N,N-diethylhydroxylamine per million parts by mole of styrene.

FIG. 5 is a plot of the PS/PP ratio along the radius of the polymer particles (graft copolymer 4) against the distance from the surface of the polymer particles in microns when no DEHA was added and when 750 parts of DEHA per million parts of styrene (by mole) were added. The plots were made by FTIR mapping. A very pronounced polystyrene surface layer was found on the polymer particles without the addition of DEHA. When 750 ppm DEHA were added during graft polymerization, the surface polystyrene concentration was greatly decreased, and the polystyrene concentration increased in the interior of the particles.

EXAMPLE 13

This example describes the effect on reactor fouling of adding DEHA to the monomer feed as a PRM during a graft polymerization reaction. The graft copolymer was made from a propylene homopolymer as the backbone polymer, to which was grafted polystyrene.

The propylene homopolymer used as the backbone of the graft copolymer had a porosity of 0.51 cm³/g. The graft copolymer was prepared as described as in Example 1 except that the reaction temperature was 110° C. for the Control Sample and Samples 1 and 2, and the monomer to peroxide molar ratio was 49.0 at 110° C. Forty-five parts of styrene were added per hundred parts of polypropylene.

In order to quantify the degree of reactor fouling, a "test coupon", an in-line filter basket containing 40 g of the propylene homopolymer, was placed in the gas recirculation stream. The % increase in weight of the test coupon during the reaction was an indication of the extent of reactor fouling. The greater the weight increase, the more reactor fouling occurred.

The amount of DEHA introduced, the % yield calculated from the mass balance, the PS content of the product measured by FTIR, the reaction temperature, and the % increase in coupon weight are given in Table 14.

TABLE 14

| Sample | PRM | Yield (wt. %) | Product PS Content (pph) | Reaction Temp. (° C.) | Coupon Wt. Increase (wt. %) |
|---|---|---|---|---|---|
| Control | None | 95.2 | 41.1 | 110 | 30.0 |
| 1 | DEHA, 1000 ppm (mol) | 97.3 | 42.1 | 110 | 17.0 |
| 2 | DEHA, 1000 ppm (mol) | 97.3 | 38.9 | 110 | 23.2 |
| 3 | DEHA, 1000 ppm (mol) | 94.7 | 37.2 | 120 | 6.75 |

The data show that the use of DEHA in the monomer feed resulted in a reduction in gas loop fouling, especially at the higher reaction temperature.

EXAMPLE 14

This example describes the effect on reactor fouling of adding DEHA to the monomer feed as a PRM during a graft polymerization reaction. The graft copolymer was made from a propylene homopolymer as the backbone polymer, to which was grafted poly(methyl methacrylate-co-methyl acrylate) (PMMA).

The propylene hoinopolymer used as the backbone of the graft copolymer had a porosity of 0.51 cm³/g. The graft copolymer was prepared as described in Example 1, except that the reaction temperature was 115° C., the monomer to peroxide molar ratio was 120, the molar ratio of methyl methacrylate to methyl acrylate was 95 to 5, and 45 parts of monomer were added per hundred parts of polypropylene.

The degree of reactor fouling was quantified as described in Example 13. The amount of DEHA introduced, the % yield calculated from the mass balance, the PMMA content of the product measured by FTIR, and the % increase in coupon are given in Table 15.

TABLE 15

| Sample | Inhibitor | Yield (wt. %) | Product PMMA Content (pph) | Coupon Wt. Increase (wt. %) |
|---|---|---|---|---|
| Control | None | 100.0 | 33.8 | 45.5 |
| 1 | DEHA 500 ppm (mol) | 100.0 | 39.6 | 22.0 |
| 2 | DEHA 500 ppm (mol) | 96.6 | 39.9 | 20.0 |

The data show that the use of DEHA in the monomer feed resulted in a reduction in gas loop fouling.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for making a graft copolymer comprising, in a substantially non-oxidizing environment, (a) treating particles of a propylene polymer material with an organic compound that is a free radical polymerization initiator;

(b) treating the particles of propylene polymer material over a period of time that coincides with or follows (a), with or without overlap, with about 5 to about 240 parts of at least one grafting monomer capable of being polymerized by free radicals, per hundred parts of the propylene polymer material, in the presence of a polymerization rate modifier capable of functioning in a substantially non-oxidizing environment, to retard polymerization on the surface of the particles so that the polymerized monomer content is lower on the surface than in the interior of the particles; and (c) removing any unreacted grafting monomer from the resulting grafted propylene polymer material, decomposing any unreacted initiator, and deactivating any residual free radicals in the material.

2. The process of claim 1, wherein the propylene polymer material is selected from the group consisting of:

(a) a crystalline homopolymer of propylene having an isotactic index greater than 80;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polyinerized ethylene content is 5% by weight, the terpolymer having an isotactic index greater than 85;

(d) an olefin polymer composition comprising:
      (i) about 10 parts to about 60 parts by weight of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
      (ii) about 3 parts to about 25 parts by weight of a copolymer of ethylene and propylene or a $C_4$–$C_8$ α-olefin that is insoluble in xylene at ambient temperature; and
      (iii) about 30 parts to about 70 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g;
   the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa; and (e) a thermoplastic olefin comprising:
      (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85;
      (ii) about 20% to about 60% of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
      (iii) about 3% to about 40% of a copolymer of ethylene and propylene or a $C_4$–$C_8$ α-olefin that is insoluble in xylene at ambient temperature,
   wherein the composition has a flexural modulus of greater than 150 but less than 1200 MPa.

3. The process of claim 2, wherein the propylene polymer material is a propylene homopolymer.

4. The process of claim 1, wherein the grafting monomer is selected from the group consisting of styrene, methyl methacrylate, methyl acrylate, methacrylic acid, maleic anhydride, and acrylonitrile.

5. The process of claim 1, wherein the polymerization modifier is selected from the group consisting of (a) sulfur, (b) benzoquinone and its derivatives, and (c) hydroxylamine and its derivatives.

6. The process of claim 5, wherein the polymerization modifier is N,N-diethylhydroxylamine.

* * * * *